June 26, 1934.  L. M. BROOKS  1,964,619
SELF EXCITING CURRENT GENERATOR
Filed Sept. 11, 1933    2 Sheets-Sheet 1
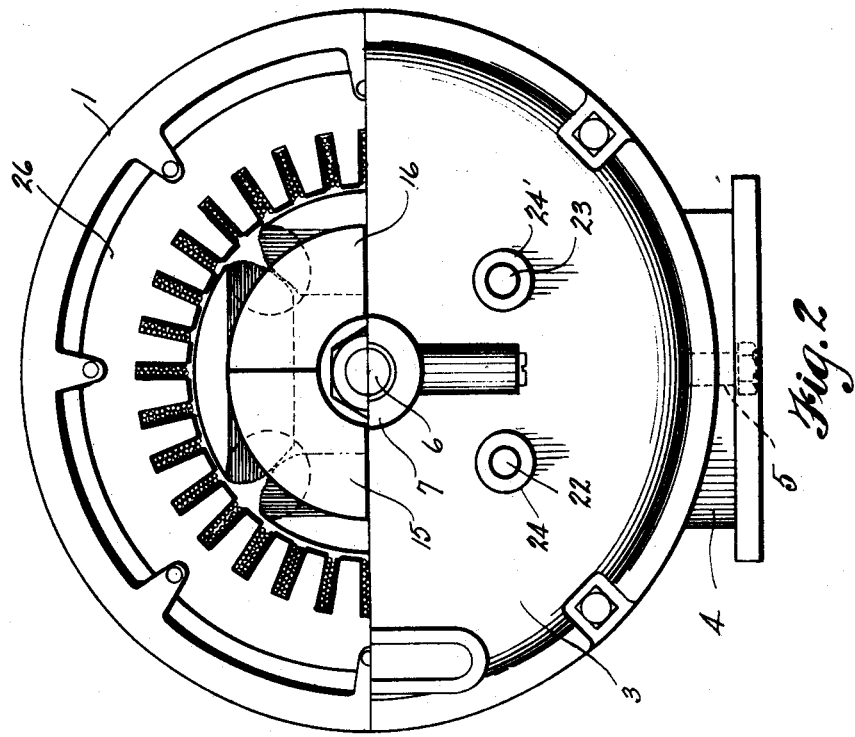
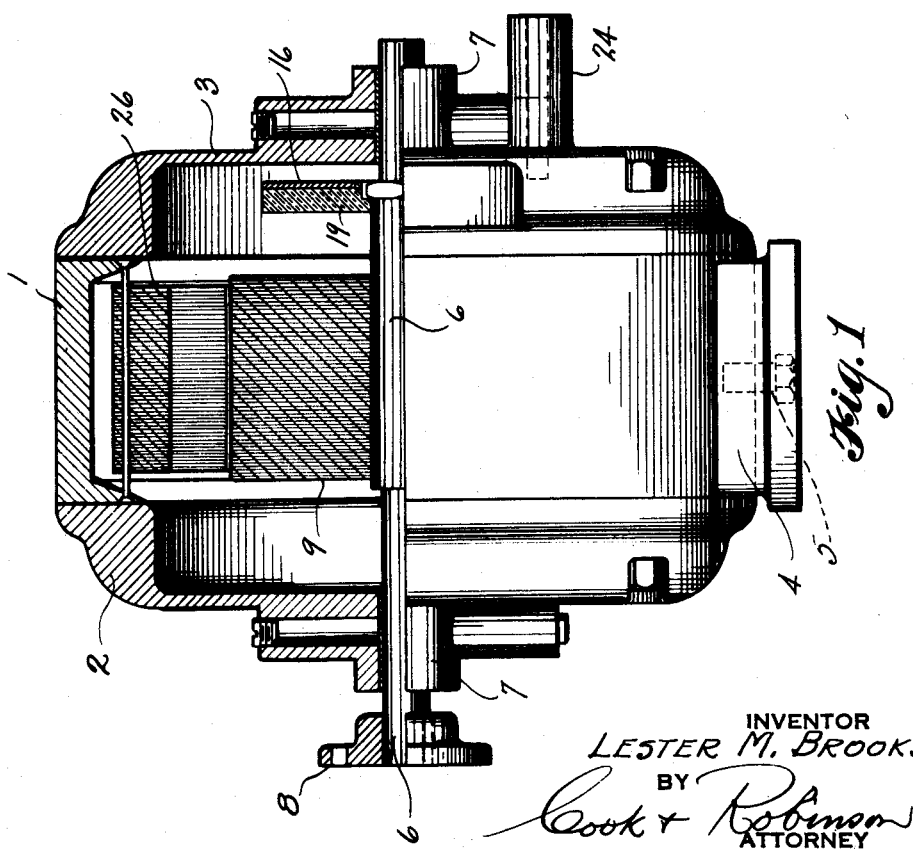
INVENTOR
LESTER M. BROOKS
BY
Cook + Robinson
ATTORNEY

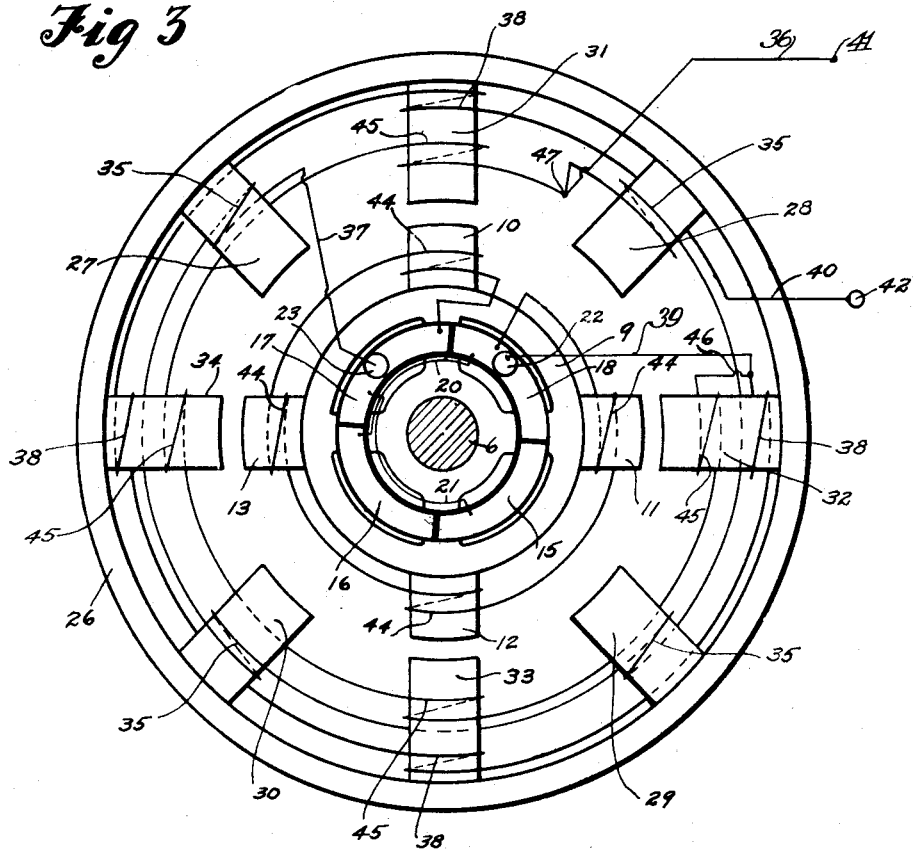
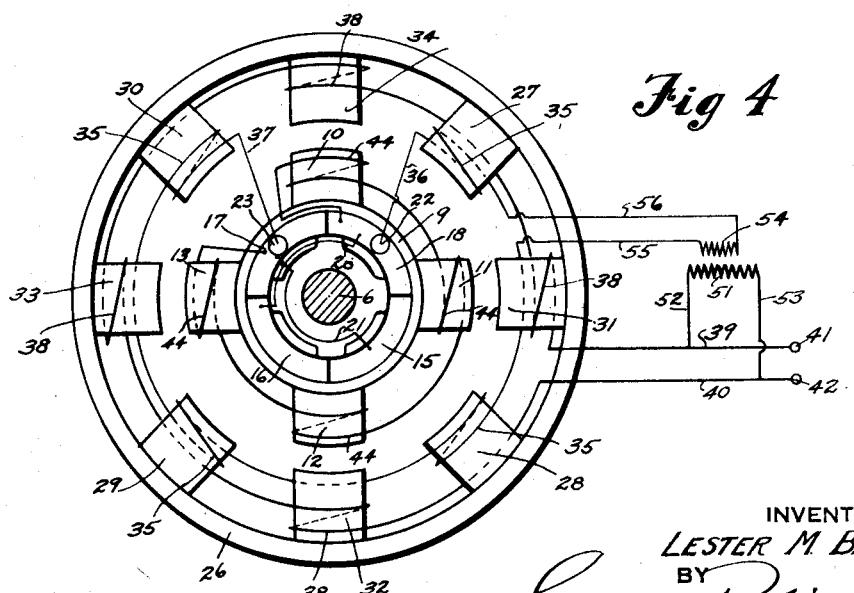

Patented June 26, 1934

1,964,619

UNITED STATES PATENT OFFICE 1,964,619

SELF EXCITING CURRENT GENERATOR

Lester M. Brooks, Seattle, Wash., assignor to Weco Manufacturing Company, Inc., Seattle, Wash.

Application September 11, 1933, Serial No. 688,921

4 Claims. (Cl. 171—119)

This invention relates to improvements in current generators, and has for its principal object to provide a novel form of alternating current generator for use as a part of a portable unit that is especially adapted to and desirable for use in camps, summer homes, and for field work where other sources of electric power are not available.

More specifically stated, the present invention resides in the provision of a current generator of the above stated character that is self exciting and with which there is provided an automatic voltage regulation free of moving parts.

Other objects of the invention reside in the various details of construction and combination of parts whereby a compact, light, easily portable and efficient generator is provided.

In accomplishing these and other objects of the invention I have provided the improved details of construction, the preferred forms of which are illustrated in the accompanying drawings, wherein—

Fig. 1 is a view, partly in elevation and partly in section, of a generator embodied by the present invention.

Fig. 2 is a view showing the generator in end elevation, and with the upper portion of one of the side plates of the housing removed for better illustration.

Fig. 3 is a view diagrammatically disclosing the relationship of parts and the circuit wiring.

Fig. 4 is a view diagrammatically illustrating an alternative means of effecting voltage regulation.

Referring more in detail to the drawings—

In a preferred form of construction the generator is enclosed in a housing comprising a cylindrical body portion 1 to which opposite face plates 2 and 3 are applied and secured in the usual manner, with a base 4 secured to the part 1 by suitable means, such as the bolt 5.

Disposed axially of the housing is the generator driving shaft 6 which is revolubly mounted in bearings 7—7 in the opposite face plates, and at one end of the shaft is a coupling 8 for connecting the shaft with a driving means, which may be of any suitable character.

Fixed to the shaft, in a manner to be revolved thereby within the housing, is an electro-magnet 9 comprising two pairs of magnetic poles designated at 10, 11, 12 and 13. The paired poles 10 and 11 and also the paired poles 12 and 13, as will be observed by reference to Fig. 3, are spaced ninety degrees apart.

Fixed on the shaft 6, just within the face plate 3, is a commutator comprising four segmental portions 15, 16, 17 and 18, of equal size, insulated from each other and from the shaft by a mounting disk 19, as seen in Fig. 1. The segments 16 and 18 are disposed diametrically opposite each other and are electrically joined by the connector 20. Likewise, the segments 15 and 17 are diametrically opposite each other and are electrically joined by a connector 21. A pair of brushes 22 and 23, of carbon or other suitable material, are mounted in guides 24—24' in the face plate 3 from which they are insulated, and bear in brushing contact with the commutator segments as the latter revolve with the shaft 6. The brushes are equally spaced from the axis of rotation of the commutator and are spaced at a ninety degree interval relative to the axis so that they will simultaneously move into and from contact with adjacent segments of the commutator as it rotates.

Supported within the housing 1 concentrically about the shaft 6 and electro-magnet, is an armature 26 having armature poles 27, 28, 29 and 30 formed thereon at ninety degree intervals, and alternating with these, at ninety electrical degrees in spacing, are poles 31, 32, 33 and 34.

Wound on the poles 27, 28, 29 and 30 are coils 35 all of which are connected in series and the series connected at one end by a wire 36 with an output terminal 41 and connected at its other end by wire 37 with the brush 23. Wound on the poles 31, 32, 33 and 34 are output coils 38 in series connection with one end of the series connected by a wire 39 with the brush 22 and the other end of the series connected by a wire 40 with an output terminal 42.

The coils 35 are so wound on their respective poles that an alternating electromotive force will be induced between their terminals when electro-magnet 9 is rotated, therefore these coils comprise an exciting winding. The coils 38 are such that an alternating electromotive force will be induced between their terminals when the armature is rotated.

Wound on the poles 10, 11, 12 and 13 are coils 44 which constitute field windings. These coils are all connected together in series and the opposite ends of the series are electrically connected, respectively, with adjacent commutator segments 17 and 18. This provides that an alternating current flowing through the brushes will be caused to flow through the field winding as a pulsating direct current.

For the purpose of obtaining voltage regulation, auxiliary windings 45 of a given number of turns are added to the output windings 38 on the poles 31, 32, 33 and 34. These auxiliary windings are connected in series with each other and one end of the series is connected to the output connection 36 at the point 47 and the other end of the series is connected at 46 to the wire 39 leading to the brush 22. For the purpose presently explained, the brushes are offset a given amount from the neutral position.

With this method of voltage regulation, as the load increases, the current in the output winding is increased. This increases the current flowing through the auxiliary winding which, together with the current flowing in the exciting winding, is brought through brushes 22 and 23, and is rectified by action of the commutator and excites the field as a direct current. At a constant speed, the current in the exciting winding remains constant, but, as the output increases, the current in the output and auxiliary winding increases. The resultant current in the auxiliary and exciting windings then is increased and a larger field current results. This larger field current increases the magnetic field and raises the output voltage to compensate for its drop with increasing load. The desired increase in voltage is given by using the proper number of turns in the auxiliary windings 45.

Should the brushes be set to give good commutation at no load, poor commutation would result at full load since the resultant of the auxiliary and exciting current would be shifted, hence sparking would result. To overcome this the commutator is moved on the shaft a small amount (determined by experiment to give best results) until the neutral position is found. Since the machine operates at this position the greater part of the time and the current at no load is small, satisfactory comutation is given along with the required regulation of voltage.

As an alternative means of obtaining voltage regulation, I use the means diagrammatically shown in Fig. 4, wherein the auxiliary windings 45 are omitted and a small transformer 50 is associated with the generator and this has its primary coil 51 connected by taps 52 and 53 with the output lines 39 and 40 and has its secondary coil 54 joined in series by wires 55 and 56 in the exciting circuit incuding the coils 35, and by reason of which an automatic regulation of voltage in the current output is provided for. With the parts so associated, the operation of the generator, briefly stated, is as follows:

Assuming the shaft 6 to be revolubly driven by suitable means thereby to revolve the electromagnet 9 at a constant speed, the revolving magnetic field will be cut by conductors of the output and exciting windings. As each conductor passes through the field an electro-motive force rapidly reaches its maximum as the conductor is entering the field and rapidly decreases to zero as the conductor is leaving the field. Since the output and exciting windings are spaced at ninety electrical degrees, the E. M. F. in the exciting winding will be ninety degrees out of phase with E. M. F. induced in the output winding.

The alternating current from the exciting windings is brought to the commutator through the brushes and the terminals of the field windings are so connected to the commutator segments that the alternating current flowing through the brushes will flow through the field windings as a pulsating direct current.

Having thus described my invention, what I claim as new therein and desire to secure by Letters Patent is—

1. In an alternating current generator, an armature, field magnets revoluble therein; said armature comprising output windings in which alternating current is induced as power output, other winding in the armature in which alternating current for field excitation is generated, a commutator rotatable with the field magnets and through which the current induced in the second mentioned windings is passed as direct current to the exciting windings of the field magnets, and an auxiliary winding added in the armature to the output windings and connected to the output and to the exciting circuit whereby added current is fed through the commutator to the field magnets in accordance with increase of load on the output.

2. In an alternating current generator, an armature, a field revoluble therein; said armature comprising windings in series connection for delivery of an induced alternating power current and other windings in series connection for delivery of induced alternating field exciting current, a commutator revolving with the field for rectifying the field exciting current and through which it is delivered as direct current to the field windings for field excitation and a voltage regulating transformer having a secondary winding in series connection with the exciting windings and its primary winding connected across the output connections of the output circuit.

3. In an alternating current generator, an armature, field magnets rotatable relative thereto; said armature comprising output windings connected with the power output terminals and in which windings alternating current is induced, another set of windings ninety electrical degrees out of phase with the power output windings and in which alternating current for field excitation is induced, and a commutator operable to rectify and deliver the latter current to the coils of the field magnets to excite the field.

4. An alternating current generator comprising revoluble field magnets, a pair of output terminals, an armature associated with the field magnets having an output winding connected at one end with one terminal, an auxiliary winding connected in series with the output winding and to the other terminal and a third armature winding ninety electrical degrees out of phase with the output windings connected in series with the auxiliary winding to deliver an alternating current for field excitation and a means for rectifying and delivering the resultant of the voltages induced in the auxiliary and third windings to the coils of the field magnets to excite the field.

LESTER M. BROOKS.